(12) United States Patent
Nakamizo

(10) Patent No.: US 10,348,991 B2
(45) Date of Patent: Jul. 9, 2019

(54) SOLID-STATE IMAGE PICKUP DEVICE WITH LOAD TRANSISTORS, METHOD FOR CONTROLLING THE SAME, AND ELECTRONIC APPARATUS

(71) Applicant: SONY CORPORATION, Tokyo (JP)

(72) Inventor: Masahiko Nakamizo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/556,388

(22) PCT Filed: Mar. 3, 2016

(86) PCT No.: PCT/JP2016/056615
§ 371 (c)(1),
(2) Date: Sep. 7, 2017

(87) PCT Pub. No.: WO2016/147887
PCT Pub. Date: Sep. 22, 2016

(65) Prior Publication Data
US 2018/0048838 A1    Feb. 15, 2018

(30) Foreign Application Priority Data
Mar. 17, 2015   (JP) ................ 2015-053225

(51) Int. Cl.
*H04N 5/369*   (2011.01)
*H04N 5/355*   (2011.01)
(Continued)

(52) U.S. Cl.
CPC .......... *H04N 5/3698* (2013.01); *H04N 5/355* (2013.01); *H04N 5/378* (2013.01); *H04N 5/37457* (2013.01); *H04N 5/3745* (2013.01)

(58) Field of Classification Search
CPC ..... H04N 5/3698; H04N 5/355; H04N 5/3745
See application file for complete search history.

(56) References Cited

U.S. PATENT DOCUMENTS

| 7,498,555 | B2 * | 3/2009 | Koh ........................ | H04N 3/155 |
| | | | | 250/208.1 |
| 2011/0176042 | A1 | 7/2011 | Kato et al. | |
| 2015/0208008 | A1 * | 7/2015 | Gendai ................ | H04N 5/3698 |
| | | | | 250/208.1 |

FOREIGN PATENT DOCUMENTS

| JP | 2009-284198 A | 12/2009 |
| JP | 2010-093653 A | 4/2010 |

(Continued)

OTHER PUBLICATIONS

International Search Report prepared by the Japan Patent Office dated Apr. 4, 2016, for International Application No. PCT/JP2016/056615.

*Primary Examiner* — Padma Haliyur
(74) *Attorney, Agent, or Firm* — Sheridan Ross P.C.

(57) ABSTRACT

The present technique relates to a solid-state image pickup device capable of realizing low power consumption in a simpler configuration, a control method therefor, and an electronic apparatus. The solid-state image pickup device includes a pixel array section that has a plurality of pixels arranged two-dimensionally in a matrix shape, load transistors each of which configures a source follower circuit with an amplification transistor of each pixel of the pixel array section, and a control circuit that, in accordance with the amount of light received by one or more of the pixels, controls a supply voltage of each of the load transistors or controls a current flowing through each of the load transistors. The present technique can be applied to a solid-state image pickup device, for example.

10 Claims, 12 Drawing Sheets

(51) Int. Cl.
*H04N 5/378* (2011.01)
*H04N 5/3745* (2011.01)

(56) References Cited

FOREIGN PATENT DOCUMENTS

| | | |
|---|---|---|
| JP | 2011-29734 A | 2/2011 |
| JP | 2012-199731 A | 10/2012 |
| JP | 2013-219466 A | 10/2013 |
| JP | 2014-116762 | 6/2014 |
| WO | WO 2007/000879 | 4/2007 |

* cited by examiner

SOLID-STATE IMAGE PICKUP DEVICE WITH LOAD TRANSISTORS, METHOD FOR CONTROLLING THE SAME, AND ELECTRONIC APPARATUS

CROSS REFERENCE TO RELATED APPLICATIONS

This application is a national stage application under 35 U.S.C. 371 and claims the benefit of PCT Application No. PCT/JP2016/056615 having an international filing date of 3 Mar. 2016, which designated the United States, which PCT application claimed the benefit of Japanese Patent Application No. 2015-053225 filed 17 Mar. 2015, the disclosures of which are incorporated herein by reference in their entirety.

TECHNICAL FIELD

The present technique relates to a solid-state image pickup device, a control method therefor, and an electronic apparatus, and relates, in particular, to a solid-state image pickup device capable of realizing low power consumption in a simpler configuration, a control method therefor, and an electronic apparatus.

BACKGROUND ART

Various techniques for reducing power consumption of a solid-state image pickup device have been proposed.

In PTL 1, for example, reducing power consumption by the following technique is proposed. Pixel synthesis between a signal with long exposure time and a signal with short exposure time is performed a plurality of times, existence of a moving object is decided based on a differential signal between the signal with long exposure time and the signal with short exposure time, and when absence of a moving object is decided, at least some of signal processing circuits are stopped.

Further, in PTL 2, for example, reducing power consumption by the following technique is proposed. When light is incident to a photodiode in a predetermined period after a potential VPD of the photodiode is reset to a predetermined potential VRST, the potential VPD of the photodiode is reduced by an amount corresponding to the amount of the incident light. Thereafter, a falling ramp voltage VRAMP is applied to a source terminal of a metal oxide semiconductor (MOS) transistor which is a source grounding type amplifier for reading the potential VPD of the photodiode. When a voltage difference between a gate and a source of the MOS transistor exceeds a threshold voltage, the MOS transistor is turned on and the output falls rapidly. When a comparator circuit generates a signal having a pulse width from a ramp voltage sweep start point to a rapid fall point of the output of the MOS transistor, the pulse width corresponds to the amount of the incident light. By reading a pixel signal in this way by a pulse width modulation (PWM) system, reducing power consumption is proposed.

CITATION LIST

Patent Literatures

[PTL 1]
JP 2014-116762 A
[PTL 2]
PCT Patent Publication No. WO2007/000879

SUMMARY

Technical Problems

According to the technique in PTL 1, however, digital circuits are the sole circuits that contribute to low power consumption, and analog circuits that occupy a relatively large ratio when pixels are miniaturized are not able to achieve low power consumption.

According to the technique in PTL 2, there is concern about the occurrence of signal interference due to photodiodes that are connected to each other via a switch element, a slow operating speed caused by the absence of an amplifier, and poor linearity due to nonlinear capacity of signal lines.

The present technique has been provided in order to solve such problems, and realizes low power consumption in a simpler configuration.

Solution to Problems

A solid-state image pickup device according to a first aspect of the present technique includes a pixel array section that has a plurality of pixels arranged two-dimensionally in a matrix shape, load transistors each of which configures a source follower circuit with an amplification transistor of each pixel of the pixel array section, and a control circuit that, in accordance with an amount of light received by one or more of the pixels, controls a supply voltage of each of the load transistors or controls a current flowing through each of the load transistors.

A method for controlling a solid-state image pickup device according to a second aspect of the present technique, the solid-state image pickup device including a pixel array section that has a plurality of pixels arranged two-dimensionally in a matrix shape, load transistors each of which configures a source follower circuit with an amplification transistor of each pixel of the pixel array section, and a control circuit that controls a current flowing through each of the load transistors. The method includes, by the control circuit, in accordance with an amount of light received by one or more of the pixels, controlling a supply voltage of each of the load transistors or controlling a current flowing through each of the load transistors.

An electronic apparatus according to a third aspect of the present technique includes a solid-state image pickup device that includes a pixel array section that has a plurality of pixels arranged two-dimensionally in a matrix shape, load transistors each of which configures a source follower circuit with an amplification transistor of each pixel of the pixel array section, and a control circuit that, in accordance with an amount of light received by one or more of the pixels, controls a supply voltage of each of the load transistors or controls a current flowing through each of the load transistors.

According to the first to third aspects of the present technique, a supply voltage of each of the load transistors or a current flowing through each of the load transistors is controlled in accordance with an amount of light received by one or more of the pixels, in a solid-state image pickup device that includes a pixel array section having a plurality of pixels arranged two-dimensionally in a matrix shape, load transistors each of which configures a source follower circuit with an amplification transistor of each pixel of the pixel array section, and a control circuit that controls a supply voltage of each of the load transistors or controls a current flowing through each of the load transistors.

The solid-state image pickup device and the electronic apparatus may be the device and the apparatus independent of each other, or may be incorporated as a module into other device.

Advantageous Effect of Invention

According to the first to third aspects of the present technique, low power consumption can be realized in a simpler configuration.

The above-described effect is not necessarily limited, and may be any one of the effects described in the present disclosure.

DESCRIPTION OF EMBODIMENTS

Embodiments for implementing the present technique (hereinafter, referred to as embodiments) will be described below. The description will be made in the following order.
1. First embodiment (an example of a configuration of a solid-state image pickup device that controls a supply voltage by frame)
2. Second embodiment (an example of a configuration of a solid-state image pickup device that controls a supply current by frame)
3. Third embodiment (an example of a configuration of a solid-state image pickup device that controls a supply voltage by area)
4. Fourth embodiment (an example of a configuration of a solid-state image pickup device that controls a supply current by area)
5. Fifth embodiment (an example of a configuration of a solid-state image pickup device in which an analog-digital converter (ADC) is disposed by pixel)
6. Sixth embodiment (an example of a configuration of a solid-state image pickup device in which an ADC is disposed by group of pixels)
7. An example of application to an electronic apparatus Example of Schematic Configuration of Solid-State Image Pickup Device FIG. 1 is a block diagram depicting an example of a schematic configuration of a solid-state image pickup device to which the present technique is applied.

Figure 1:
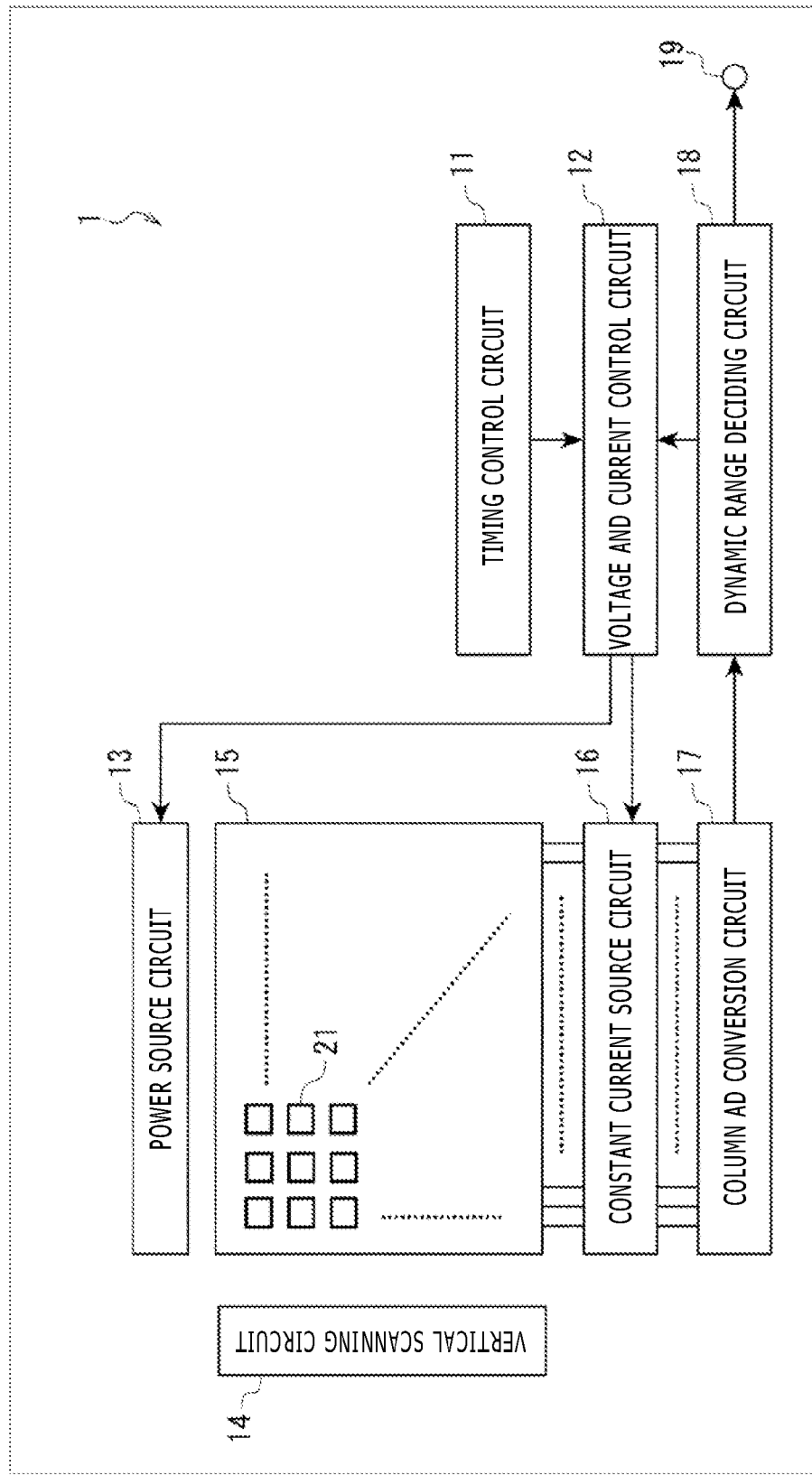
FIG. 1 is a block diagram depicting a schematic configuration of a solid-state image pickup device to which the present technique is applied.

A solid-state image pickup device 1 in FIG. 1 includes at least a timing control circuit 11, a voltage and current control circuit 12, a power source circuit 13, a vertical scanning circuit 14, a pixel array section 15, a constant current source circuit 16, a column analog to digital (AD) conversion circuit 17, a dynamic range deciding circuit 18, and an output section 19.

The timing control circuit 11 supplies a clock signal and a timing signal necessary for a predetermined operation, to the voltage and current control circuit 12, the vertical scanning circuit 14, and other circuit, based on a master clock of a predetermined frequency. For example, the timing control circuit 11 supplies a clock signal which is used to control a shutter operation, a reading operation, and other operation, of pixels 21 in the pixel array section 15, to the voltage and current control circuit 12, the vertical scanning circuit 14, and other circuit. Further, although illustration is omitted, the timing control circuit 11 also supplies a clock signal and a timing signal necessary for a predetermined operation, to the column AD conversion circuit 17 and other circuit.

The voltage and current control circuit 12 determines, based on a level decision value of a dynamic range supplied from the dynamic range deciding circuit 18, at least one of a voltage value and a current value for reading, in the next one frame, a pixel signal from each pixel 21 of the pixel array section 15, and controls the power source circuit 13 and the constant current source circuit 16.

The power source circuit 13 supplies power to each pixel 21 of the pixel array section 15, the constant current source circuit 16, and other circuit, based on the control by the voltage and current control circuit 12.

The vertical scanning circuit 14 performs exposure control to each pixel 21 in the pixel array section 15. Further, the vertical scanning circuit 14 supplies a control signal for making each pixel 21 output a pixel signal at a predetermined timing, to the pixels 21 arranged in a vertical direction in the pixel array section 15.

The pixel array section 15 is configured such that the pixels 21, each having a photoelectric conversion element that generates light charges in accordance with the amount of light received and accumulates the light charges, are arranged two-dimensionally in a row direction and a column direction in a matrix shape. In this case, the row direction refers to a horizontal direction, and the column direction refers to a vertical direction.

The plurality of pixels 21 arranged in the two-dimensional array output, by row, the pixel signals accumulated by the light reception, to the column AD conversion circuit 17 via the constant current source circuit 16, based on the drive control by the vertical scanning circuit 14. A detailed configuration of the pixels 21 will be described later with reference to FIG. 2.

The constant current source circuit 16 is configured to include a plurality of load MOSs (MOS transistors) 51. At least one load MOS 51 is connected to a pixel column in the vertical direction of the pixel array section 15.

The column AD conversion circuit 17 includes a plurality of ADCs, and each ADC is disposed corresponding to a pixel column, for example, of the pixel array section 15. Each ADC executes a correlated double sampling (CDS) process and an AD conversion process to pixel signals output from the pixels 21 in the same column. Each ADC temporarily stores pixel data after the AD conversion, and outputs the pixel data sequentially to the dynamic range deciding circuit 18, following the control of a horizontal scanning circuit not depicted.

Accordingly, the pixel array section 15 sequentially outputs, by row, the pixel signals accumulated in each pixel 21, to the column AD conversion circuit 17, and the column AD conversion circuit 17 converts (AD converts) analog pixel signals of each pixel 21 supplied by row to digital pixel signals, and outputs to the dynamic range deciding circuit 18.

The dynamic range deciding circuit 18 decides, by frame, the dynamic range of the pixel signals, based on digital pixel signals supplied from the column AD conversion circuit 17. In the present embodiments, the dynamic range deciding circuit 18 detects, for the dynamic range of pixel signals in one frame period, the maximum value of digital pixel signals in the one frame period of the digital pixel signals supplied from the column AD conversion circuit 17. The dynamic range may be also detected by detecting the maximum value and a minimum value of pixel signals in one frame period. The dynamic range deciding circuit 18 classifies the dynamic range of the pixel signals detected in one frame period, into one of four-stage levels L0 to L3, and supplies a level decision value as a result of classification, to the voltage and current control circuit 12.

Further, the dynamic range deciding circuit 18 outputs the digital pixel signals supplied from the column AD conversion circuit 17, to the outside of the solid-state image pickup device 1 via the output section 19.

The solid-state image pickup device 1 having the above configuration is a complementary metal oxide semiconductor (CMOS) image sensor called a column AD system in which an ADC that performs a CDS process and an AD conversion process is disposed for each pixel column.

The solid-state image pickup device 1 includes the voltage and current control circuit 12 and the dynamic range deciding circuit 18, and has a function of reducing power consumption by controlling (adjusting) a supply voltage or a supply current, based on the dynamic range of the pixel signals detected by frame. The function will be described below.

1. First Embodiment

First, for a first embodiment of the solid-state image pickup device 1, a voltage control process for controlling a supply voltage based on the dynamic range of pixel signals will be described.

Figure 2:
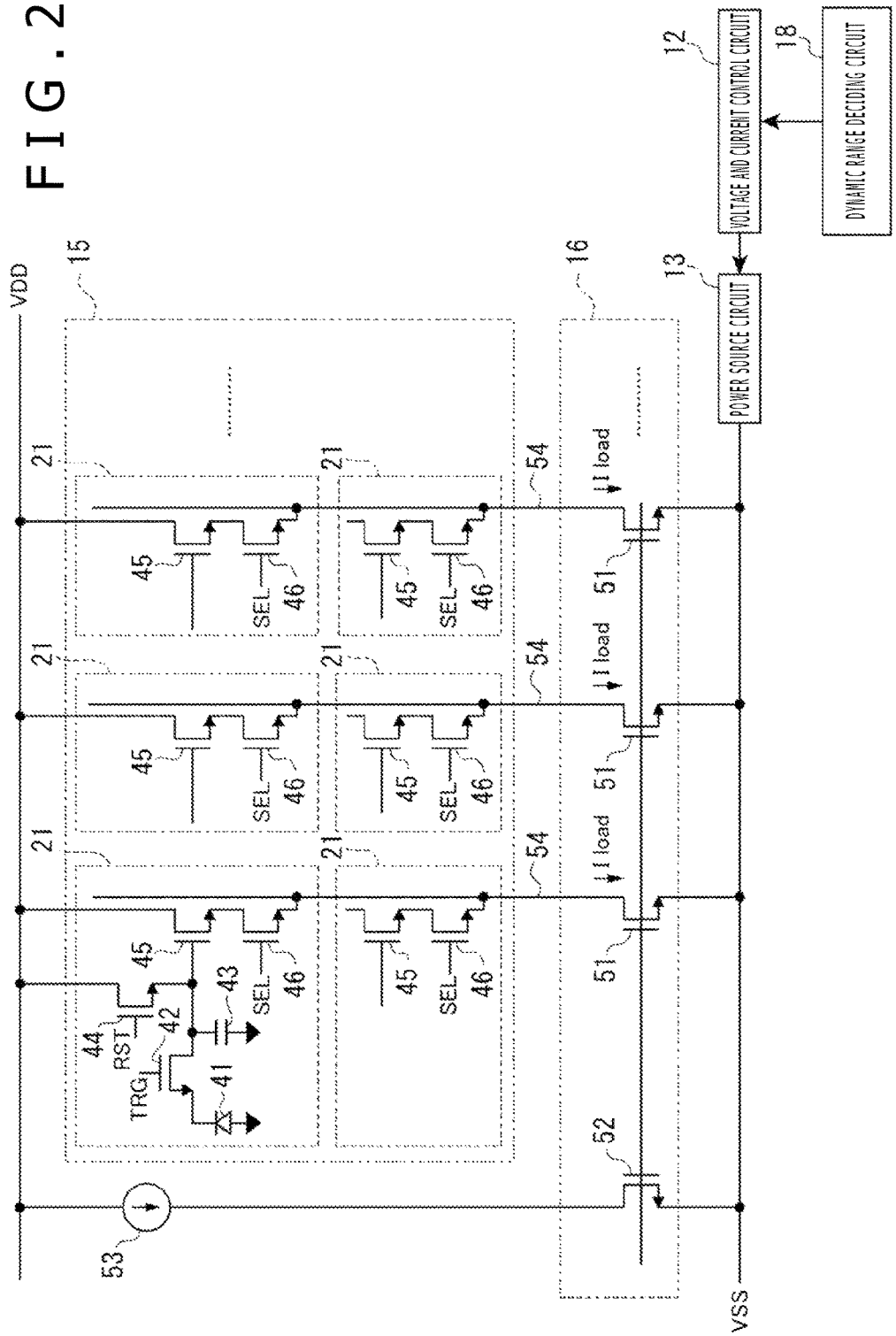
FIG. 2 is a diagram depicting a detailed circuit configuration of a pixel array section and a constant current source circuit according to a first embodiment.

Example of Circuit Configuration of Pixel Array Section and Constant Current Source Circuit FIG. 2 is a diagram depicting a detailed circuit configuration of the pixel array section 15 and the constant current source circuit 16.

Each pixel 21 has a photodiode 41 working as a photoelectric conversion element, a transfer transistor 42, a floating diffusion (FD) 43, a reset transistor 44, an amplification transistor 45, and a selection transistor 46.

In FIG. 2, although a detailed configuration of the pixel 21 is illustrated for one pixel by omitting a detailed illustration of the rest pixels 21, each pixel 21 has the same circuit configuration.

The photodiode 41 generates charges corresponding to the amount of light received (signal charges), and accumulates the charges. The photodiode 41 has its anode terminal grounded, and has a cathode terminal connected to the FD 43 via the transfer transistor 42.

The transfer transistor 42, when it is turned on by a transfer signal TRG, reads the charges generated by the photodiode 41, and transfers the charges to the FD 43.

The FD 43 holds a charge that has been read from the photodiode 41. The reset transistor 44, when it is turned on based on a reset signal RST, resets the potential of the FD 43 when the charges accumulated in the FD 43 are discharged to a drain (a constant voltage source VDD).

The amplification transistor 45 outputs a pixel signal corresponding to the potential of the FD 43. That is, the amplification transistor 45 configures a source follower circuit with the load MOS 51 of the constant current source circuit 16 connected via a vertical signal line 54, so that a pixel signal indicating a level corresponding to the charges accumulated in the FD 43 is output to the column AD conversion circuit 17 from the amplification transistor 45 via the selection transistor 46.

The selection transistor 46 is turned on when the pixel 21 is selected based on a selection signal SEL, and the selection transistor 46 outputs the pixel signal of the pixel 21, to the column AD conversion circuit 17 via the vertical signal line 54. The transfer signal TRG, the selection signal SEL, and the reset signal RST are driven by the vertical scanning circuit 14.

While the pixel 21 can have the above configuration, the configuration is not limited, and other configuration can be also employed.

The constant current source circuit 16 includes the load MOS 51 which is provided for each pixel column, and a MOS transistor 52 which configures a current mirror circuit with the load MOSs 51, as depicted in FIG. 2. A current Iload flowing through each load MOS 51 is the same as a current flowing through the MOS transistor 52 from a current source 53.

A level decision value (any one of the level L0 to the level L3) based on the dynamic range of the pixel signals of the pixels 21 in the pixel array section 15 in one frame period, is supplied to the voltage and current control circuit 12 from the dynamic range deciding circuit 18, as described above.

The voltage and current control circuit 12 supplies set values V0 to V3 of a source voltage VSS of the load MOS 51, to the power source circuit 13, based on the level decision value supplied.

The power source circuit 13 applies, in the next one frame period, the source voltage VSS of the load MOS 51, based on the set values V0 to V3 supplied from the voltage and current control circuit 12.

Description of Voltage Control

Figure 3:
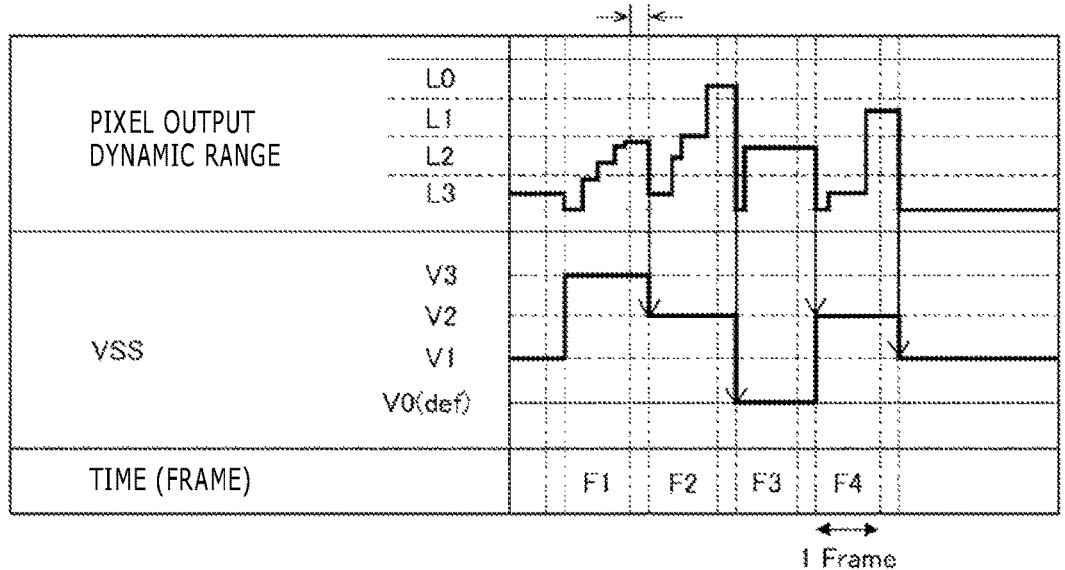
FIG. 3 is a diagram describing voltage control according to the first embodiment.

With reference to FIG. 3, voltage control by the voltage and current control circuit 12 in the first embodiment will be described.

FIG. 3 depicts (signal levels of) pixel signals of the pixels 21 of the pixel array section 15 in each frame period, and the source voltage VSS of the load MOS 51 which is set by the voltage and current control circuit 12.

The dynamic range deciding circuit 18 determines, in a level decision and feedback (FB) control period, a level decision value, that is, any one of the level L0 to the level L3 (L3<L2<L1<L0), based on digital pixel signals supplied in one frame period from the column AD conversion circuit 17. When the level decision value supplied from the dynamic range deciding circuit 18 is the level L0, the voltage and current control circuit 12 sets in the level decision and FB control period, the source voltage VSS of the load MOS 51 in the next one frame period to have the set value V0 out of the four-stage set values V0 to V3 (V0<V1<V2<V3). When the level decision value supplied from the dynamic range deciding circuit 18 is the level L1, L2, or L3, the voltage and current control circuit 12 respectively sets the source voltage VSS of the load MOS 51 in the next one frame period to have the set value V1, V2, or V3, accordingly. In this case, a default set value when not controlling a supply voltage based on the dynamic range of the pixel signal, is V0.

That is, when the dynamic range of pixel signals in a certain frame period is large, the voltage and current control circuit 12 sets the source voltage VSS of the load MOS 51 in the next one frame period to have a lower value. When the dynamic range is small, the voltage and current control circuit 12 sets the source voltage VSS of the load MOS 51 in the next one frame period to have a higher value, because a variation in the source voltage of the amplification transistor 45 is small.

In the example of FIG. 3, since the maximum value of pixel signals in a frame period F1 is within the range of the level L2 out of the four-stage levels L0 to L3, the voltage and current control circuit 12 determines the source voltage VSS of the load MOS 51 in a next frame period F2 to have the set value V2, and supplies the set value V2 to the power source circuit 13.

Since the maximum value of pixel signals in the frame period F2 is within the range of the level L0, the voltage and current control circuit 12 determines the source voltage VSS of the load MOS 51 in a next frame period F3 to have the set value V0, and supplies the set value V0 to the power source circuit 13.

Similarly, since the maximum value of pixel signals in the frame period F3 is within the range of the level L2, the source voltage VSS of the load MOS 51 in a next frame period F4 is determined to have the set value V2. Since the maximum value of pixel signals in the frame period F4 is within the range of the level L1, the source voltage VSS of the load MOS 51 in a next frame period F5 is determined to have the set value V1. For frame periods after the frame period F5, the source voltage VSS of the load MOS 51 is also controlled in a similar manner.

Flow Chart of Voltage Control Process

Figure 4:
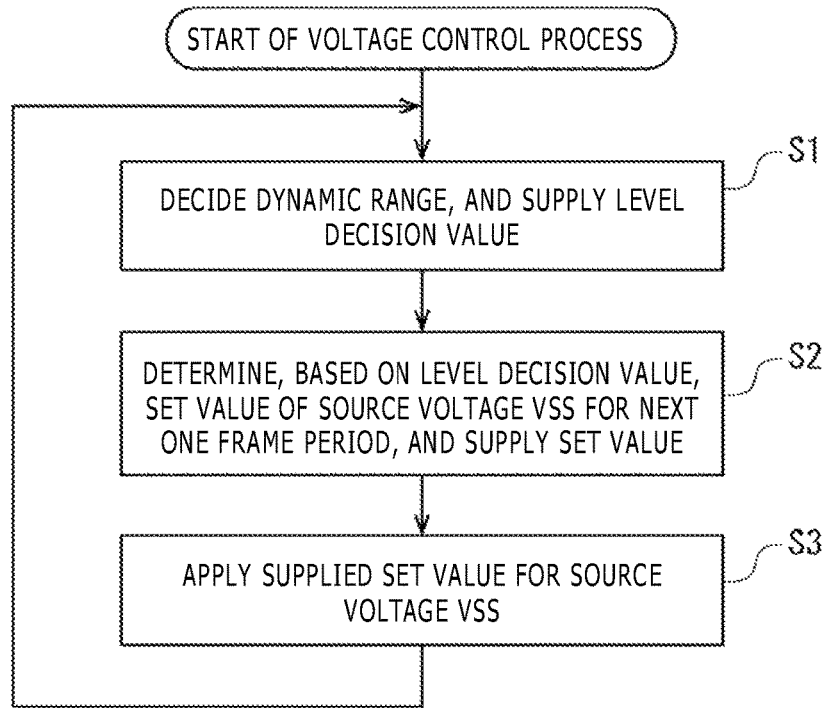
FIG. 4 is a flowchart describing a voltage control process according to the first embodiment.

With reference to a flowchart in FIG. 4, a voltage control process according to the first embodiment of the solid-state image pickup device 1 will be further described.

First, in step S1, the dynamic range deciding circuit 18, in a predetermined frame period, detects the maximum value of signal levels of pixel signals that are sequentially supplied from the column AD conversion circuit 17, stores the maximum value, and decides the dynamic range of the pixel signals of the one frame period. Then, the dynamic range deciding circuit 18 supplies, for a decision result, any one of the level decision values out of the level L0 to the level L3 to the voltage and current control circuit 12.

In step S2, the voltage and current control circuit 12 determines a set value (any one of V0 to V3) of the source voltage VSS for the next one frame period, based on the level decision value supplied from the dynamic range deciding circuit 18, and supplies the set value to the power source circuit 13.

In step S3, the power source circuit 13 applies the set value supplied from the voltage and current control circuit 12, for the source voltage VSS of both the load MOS 51 and the MOS transistor 52 of the constant current source circuit 16 in the next frame period.

When the process of step S3 ends, the process is retuned to step S1, and the processes of steps S1 to S3 are repeated again for the next one frame period. The processes of steps S1 to S3 are repeatedly executed until the image capturing (light reception) by the solid-state image pickup device 1 ends.

As described above, according to the voltage control process of the solid-state image pickup device 1, when the dynamic range of the pixel signals in a certain frame period is large, the source voltage VSS of the load MOS 51 in the next one frame period is set to have a low value. On the other hand, when the dynamic range is small, the source voltage VSS of the load MOS 51 in the next one frame period is set to have a high value.

When a decision result of the dynamic range is the level L0, the source voltage VSS of both the load MOS 51 and the MOS transistor 52 of the constant current source circuit 16 has the default V0. When a decision result of the dynamic range is any one of the levels L1 to L3, the source voltage VSS of both the load MOS 51 and the MOS transistor 52 of the constant current source circuit 16 is set higher than the default V0. Consequently, power consumption can be reduced.

That is, according to the first embodiment, power consumption can be reduced by adjusting in real time the source voltage VSS of the constant current source circuit 16, in accordance with the amount of light received in one frame period.

2. Second Embodiment

Next, for a second embodiment of the solid-state image pickup device 1, a current control process for controlling a supply current based on the dynamic range of pixel signals will be described.

Figure 5:
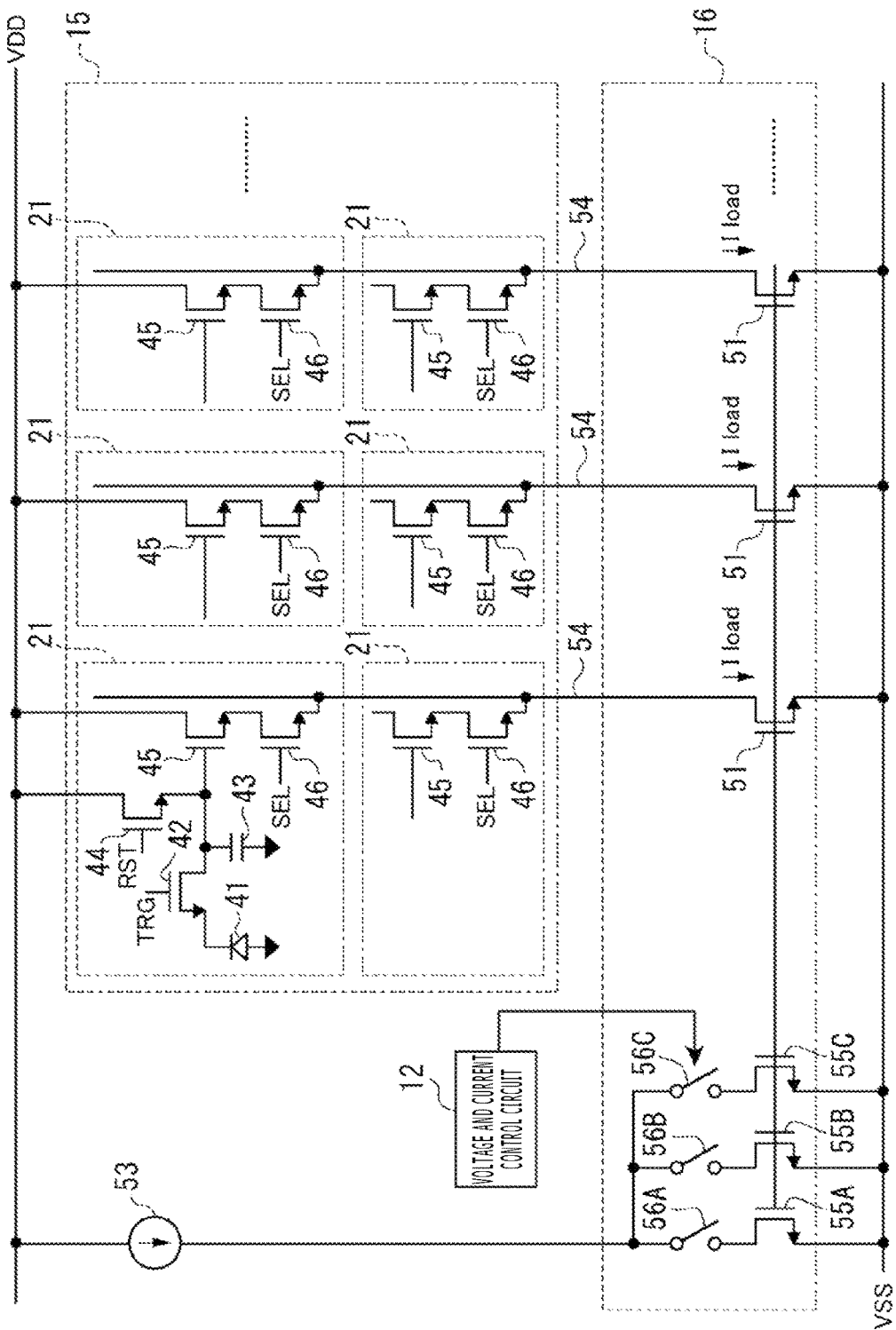
FIG. 5 is a diagram depicting a detailed circuit configuration of a pixel array section and a constant current source circuit according to a second embodiment.

Example of Circuit Configuration of Pixel Array Section and Constant Current Source Circuit FIG. 5 is a diagram depicting a detailed circuit configuration of the pixel array section 15 and the constant current source circuit 16.

In FIG. 5, portions corresponding to those in the first embodiment are denoted with the same reference signs, and description of these portions will be appropriately omitted.

In comparing FIG. 2 depicted for the first embodiment with FIG. 5, the MOS transistor 52 which configures the current mirror circuit with the load MOSs 51 is replaced, in FIG. 5, with three MOS transistors 55A to 55C provided in parallel. Further, switches 56A to 56C are also provided between the three MOS transistors 55A to 55C and the current source 53.

The switches 56A to 56C are turned on and turned off by the voltage and current control circuit 12. When the switch 56A is turned on, the MOS transistor 55A becomes valid. When the switch 56B is turned on, the MOS transistor 55B becomes valid, and when the switch 56C is turned on, the MOS transistor 55C becomes valid.

The voltage and current control circuit 12 controls the on and off of the switches 56A to 56C, based on the level decision value supplied. By controlling the on and off of the three switches 56A to 56C, the voltage and current control circuit 12 sets the current Iload flowing through the load MOS 51 to any one of current values I0 to I3 (I0<I1<I2<I3). In this case, a default set value when not controlling a supply current based on the dynamic range of the pixel signal, is I3.

For example, when only the switch 56A is turned on out of the three switches 56A to 56C, the current Iload flowing through the load MOS 51 can have the current value I0. When the switches 56A and 56C are turned on, the current Iload flowing through the load MOS 51 can have the current value I1. When the switches 56A and 56B are turned on, the current Iload flowing through the load MOS 51 can have the current value I2. When all the switches 56A to 56C are turned on, the current Iload flowing through the load MOS 51 can have the current value I3.

Description of Current Control

Figure 6:
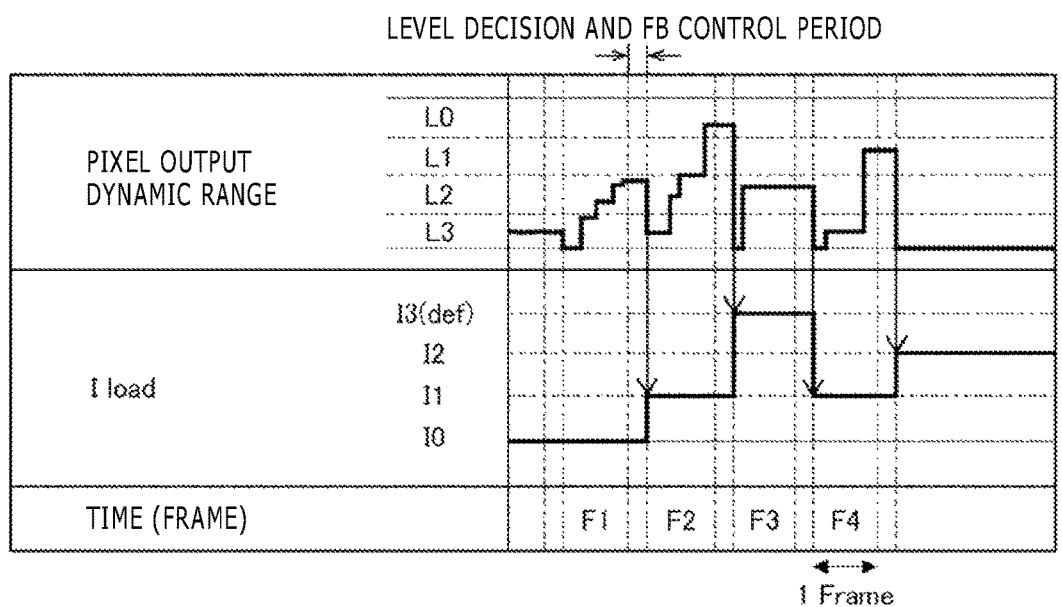
FIG. 6 is a diagram describing voltage control according to the second embodiment.

FIG. 6 depicts (signal levels of) pixel signals of the pixels 21 of the pixel array section 15 in each frame period, and the current Iload flowing through the load MOS 51 based on the switches 56A to 56C controlled by the voltage and current control circuit 12.

The dynamic range deciding circuit 18 determines, in the level decision and FB control period, a level decision value, that is, any one of the level L0 to the level L3 (L3<L2<L1<L0), based on digital pixel signals supplied in one frame period from the column AD conversion circuit 17. The voltage and current control circuit 12 controls, in the level decision and FB control period, the current Iload flowing through the load MOS 51 in the next frame period, based on the level decision value supplied from the dynamic range deciding circuit 18.

In the example of FIG. 6, since the maximum value of pixel signals in the frame period F1 is within the range of the level L2 out of the four-stage levels L0 to L3, the dynamic range deciding circuit 18 determines that the level decision value is the level L2. The voltage and current control circuit 12 controls, based on the level decision value of the level L2, the current Iload flowing through the load MOS 51 in the next frame period F2 to have the set value I1.

Next, since the maximum value of pixel signals in the frame period F2 is within the range of the level L0, the voltage and current control circuit 12 controls the current Iload flowing through the load MOS 51 in the next frame period F3 to have the set value I3.

Similarly, since the maximum value of pixel signals in the frame period F3 is within the range of the level L2, the current Iload flowing through the load MOS 51 in the next frame period F4 is controlled to have the set value I1. Since the maximum value of pixel signals in the frame period F4 is within the range of the level L1, the current Iload flowing through the load MOS 51 in the next frame period F5 is controlled to have the set value I2. For frame periods after the frame period F5, the current Iload flowing through the load MOS 51 is also controlled in a similar manner.

Flow Chart of Current Control Process

Figure 7:
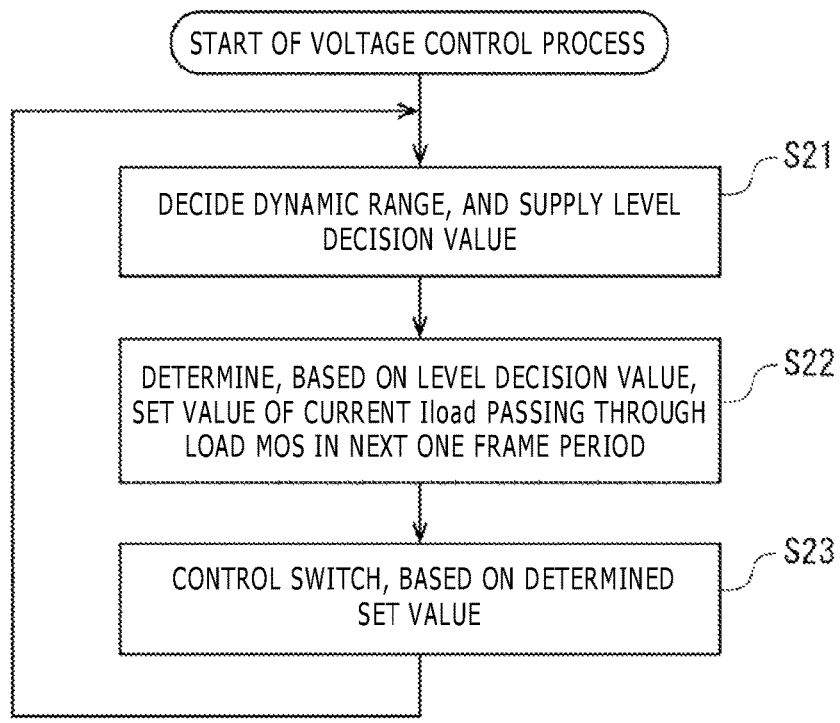
FIG. 7 is a flowchart describing a voltage control process according to the second embodiment.

With reference to a flowchart in FIG. 7, a current control process according to the second embodiment of the solid-state image pickup device will be further described.

First, in step S21, the dynamic range deciding circuit 18, in a predetermined frame period, detects the maximum value of signal levels of pixel signals that are sequentially supplied from the column AD conversion circuit 17, stores the maximum value, and decides the dynamic range of the pixel signals of the one frame period. Then, the dynamic range deciding circuit 18 supplies, for a decision result, any one of the level decision values out of the level L0 to the level L3 to the voltage and current control circuit 12.

In step S22, based on the level decision value supplied from the dynamic range deciding circuit 18, the voltage and current control circuit 12 determines a set value (any one of I0 to I3) of the current Iload passing through the load MOS 51 in the next one frame period.

In step S23, the voltage and current control circuit 12 controls the switches 56A and 56C, based on the determined set value. Accordingly, at least one of the three MOS transistors 55A to 55C is turned on, and a current which is the same as the current flowing through one or more MOS transistors 55 (55A to 55C) that are turned on flows, for the current Iload, through the load MOS 51 of the constant current source circuit 16.

When the process of step S23 ends, the process is retuned to step S21, and the processes of steps S21 to S23 are repeated again for the next one frame period. The processes of steps S21 to S23 are repeatedly executed until the solid-state image pickup device 1 ends the image capturing (light reception).

As described above, according to the current control process of the solid-state image pickup device 1, when the dynamic range of the pixel signals in a certain frame period is large, the current Iload of the load MOS 51 flowing in the next one frame period is set to have a large value. On the other hand, when the dynamic range of the pixel signals is small, the current Iload of the load MOS 51 flowing in the next one frame period is set to have a small value.

When a decision result of the dynamic range is the level L0, the current Iload flowing through the load MOS 51 of the constant current source circuit 16 has the default I3. When a decision result of the dynamic range is any one of the levels L1 to L3, the current Iload flowing through the load MOS 51 of the constant current source circuit 16 is set to have a value smaller than the default I3. Consequently, power consumption can be reduced.

That is, according to the second embodiment, power consumption can be reduced by adjusting in real time the current Iload flowing through the load MOS 51 of the constant current source circuit 16, in accordance with the amount of light received in one frame period.

3. Third Embodiment

Figure 8:
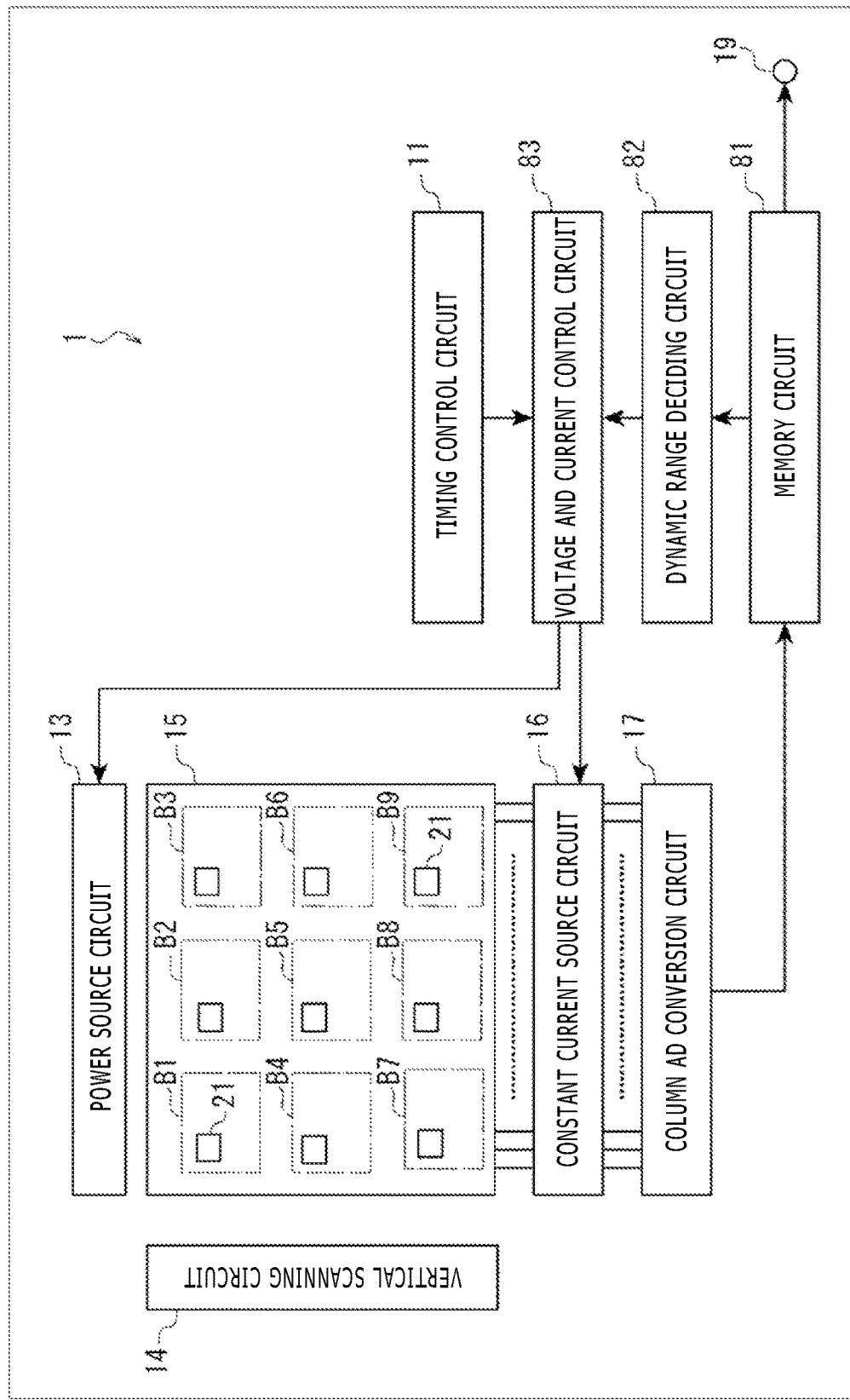
FIG. 8 is a block diagram depicting an example of a schematic configuration of a solid-state image pickup device according to a third embodiment.

FIG. 8 is a block diagram depicting an example of a schematic configuration of a solid-state image pickup device according to a third embodiment.

In FIG. 8, portions corresponding to those in FIG. 1 are also denoted with the same reference signs, and description of these portions will be appropriately omitted.

In the solid-state image pickup device 1 according to the third embodiment, a plurality of pixels 21 which are two-dimensionally arranged in the pixel array section 15 are divided into a plurality of areas. The solid-state image pickup device 1 decides the dynamic range of pixel signals for each divided area, and controls a supply voltage or a supply current.

For example, as depicted in FIG. 8, a plurality of pixels 21 in the pixel array section 15 are individually divided into three in the vertical and horizontal directions. That is, the pixels 21 are divided into nine areas B1 to B9. The number of areas into which the pixel array section 15 is divided is not limited to the present example.

A memory circuit 81 has sufficient enough memories capable of detecting the dynamic range of pixel signals of each area. The memory circuit 81 supplies, by area, the digital pixel signals that are supplied from the column AD conversion circuit 17, to a dynamic range deciding circuit 82. Further, the memory circuit 81 outputs the digital pixel signals supplied from the column AD conversion circuit 17, to the outside of the solid-state image pickup device 1 via the output section 19.

The dynamic range deciding circuit 82 decides, by area, the dynamic range of the pixel signals, based on the pixel signals by area supplied from the memory circuit 81, and supplies a decision result to a voltage and current control circuit 83.

Based on a decision result (a level decision value) of the dynamic range by area, supplied from the dynamic range deciding circuit 82, the voltage and current control circuit 83 determines, by area, the source voltage VSS or the current Iload flowing through the load MOS 51 of the constant current source circuit 16 in the next one frame, and controls the power source circuit 13 and the constant current source circuit 16.

Figure 9:
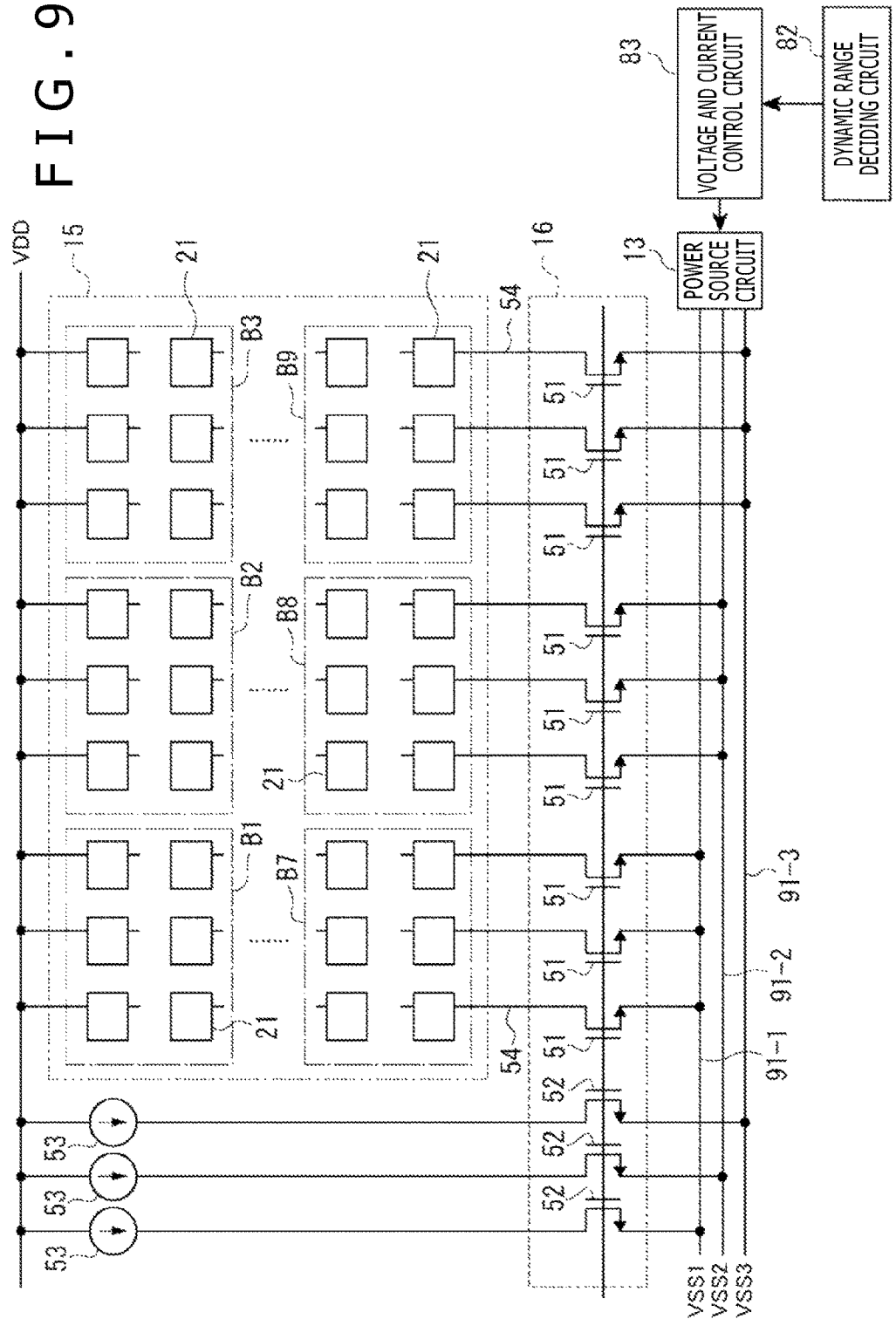
FIG. 9 is a diagram depicting a detailed circuit configuration of a pixel array section and a constant current source circuit according to the third embodiment.

Example of Circuit Configuration of Pixel Array Section and Constant Current Source Circuit FIG. 9 is a diagram depicting a detailed circuit configuration of the pixel array section 15 and the constant current source circuit 16 according to the third embodiment.

In FIG. 9, a power supply line 91 connected to the source of each load MOS 51 provided for each pixel column of the constant current source circuit 16 is different in each of three areas arranged in the horizontal direction. Specifically, the source of the load MOS 51 which is connected to the pixel 21 of an area B1 is connected to a first power supply line 91-1. The source of the load MOS 51 which is connected to the pixel 21 of an area B2 is connected to a second power supply line 91-2, and the source of the load MOS 51 which is connected to the pixel 21 of an area B3 is connected to a third power supply line 91-3.

Since the pixels 21 arranged in the vertical direction are connected to the same load MOS 51, the source of the load MOS 51 which is connected to the pixels 21 of areas B4 and B7 is connected to the first power supply line 91-1. The source of the load MOS 51 which is connected to the pixels 21 of areas B5 and B8 is connected to the second power supply line 91-2, and the source of the load MOS 51 which is connected to the pixels 21 of areas B6 and B9 is connected to the third power supply line 91-3.

The power source circuit 13 controls voltages VSS1, VSS2, and VSS3 to be supplied to the first power supply line 91-1, the second power supply line 91-2, and the third power supply line 91-3, based on a level decision value supplied from the voltage and current control circuit 83. That is, the power source circuit 13 can set different application voltages to the source voltages VSSs of the load MOSs 51, in the three areas arranged in the horizontal direction, based on the level decision values supplied from the voltage and current control circuit 83.

Further, since the read timing is different between the areas arranged at different positions in the vertical direction, the power source circuit 13 sets different application voltages, by time division control, to the three areas arranged in the vertical direction, when changing the source voltage VSS of the load MOS 51.

The voltage control process in the third embodiment is similar to the process described with reference to FIG. 4, except that the voltage and current control circuit 83 calculates by each of a plurality of divided areas the dynamic range of pixel signals and controls by area the source voltage VSS of the load MOS 51, based on a calculated dynamic range.

According to the third embodiment, power consumption can be further reduced, by dividing the pixel array section 15 into a plurality of areas, and by adjusting in real time by area the source voltage VSS of the constant current source circuit 16.

4. Fourth Embodiment

Figure 10:
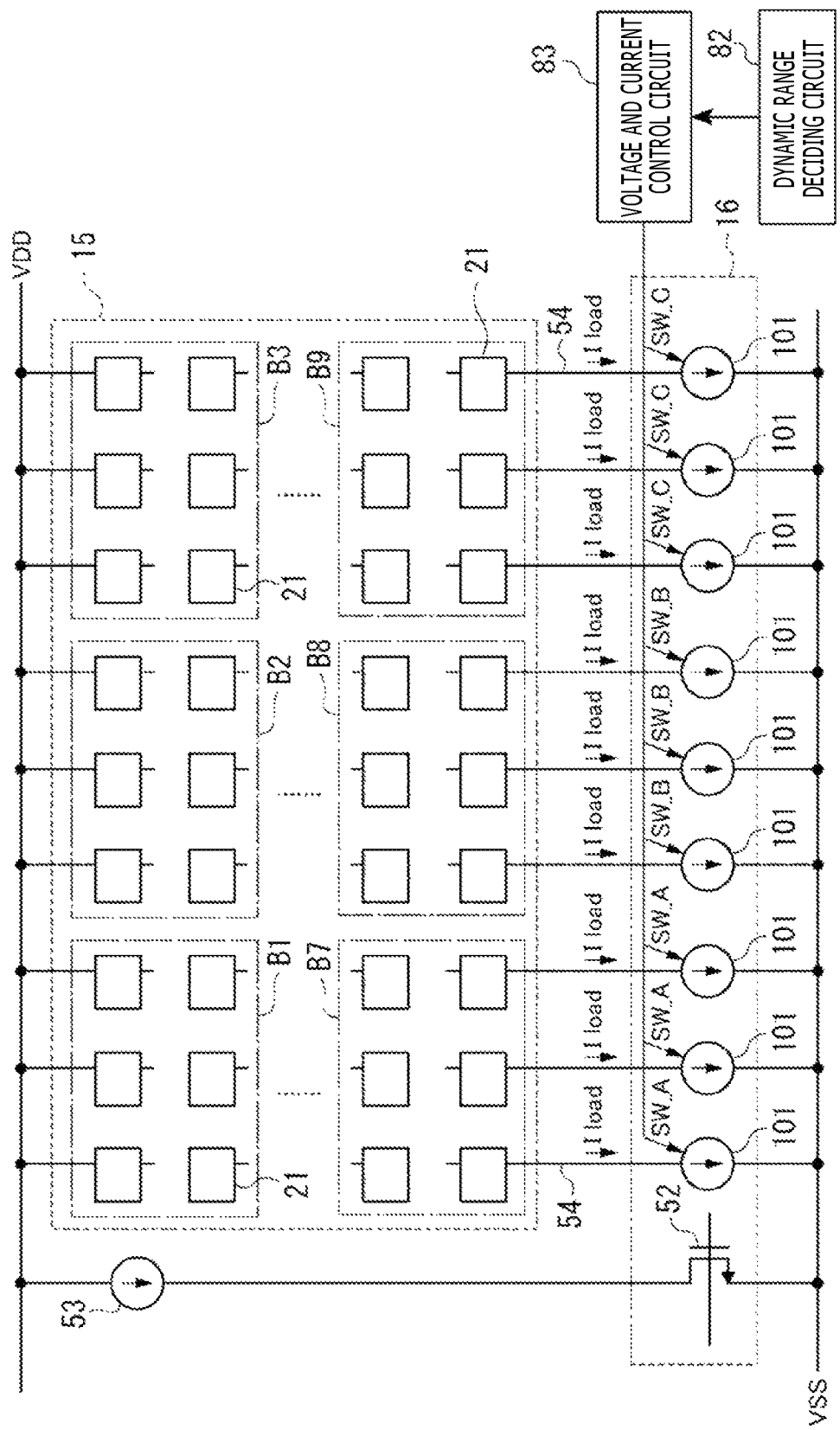
FIG. 10 is a diagram depicting a detailed circuit configuration of a pixel array section and a constant current source circuit according to a fourth embodiment.

FIG. 10 is a diagram depicting a detailed circuit configuration of the pixel array section 15 and the constant current source circuit 16, for the case of dividing the pixel array section 15 into a plurality of areas and controlling by area the supply current, according to a fourth embodiment of the solid-state image pickup device 1.

A total schematic configuration of the solid-state image pickup device 1 is similar to that of the third embodiment depicted in FIG. 8, and therefore, description of the total schematic configuration will be omitted.

In the fourth embodiment, as depicted in FIG. 10, the constant current source circuit 16 is provided with a variable current source 101 for each pixel column, each variable current source 101 capable of changing the current Iload output from the pixels 21 of the same pixel column.

Figure 11:
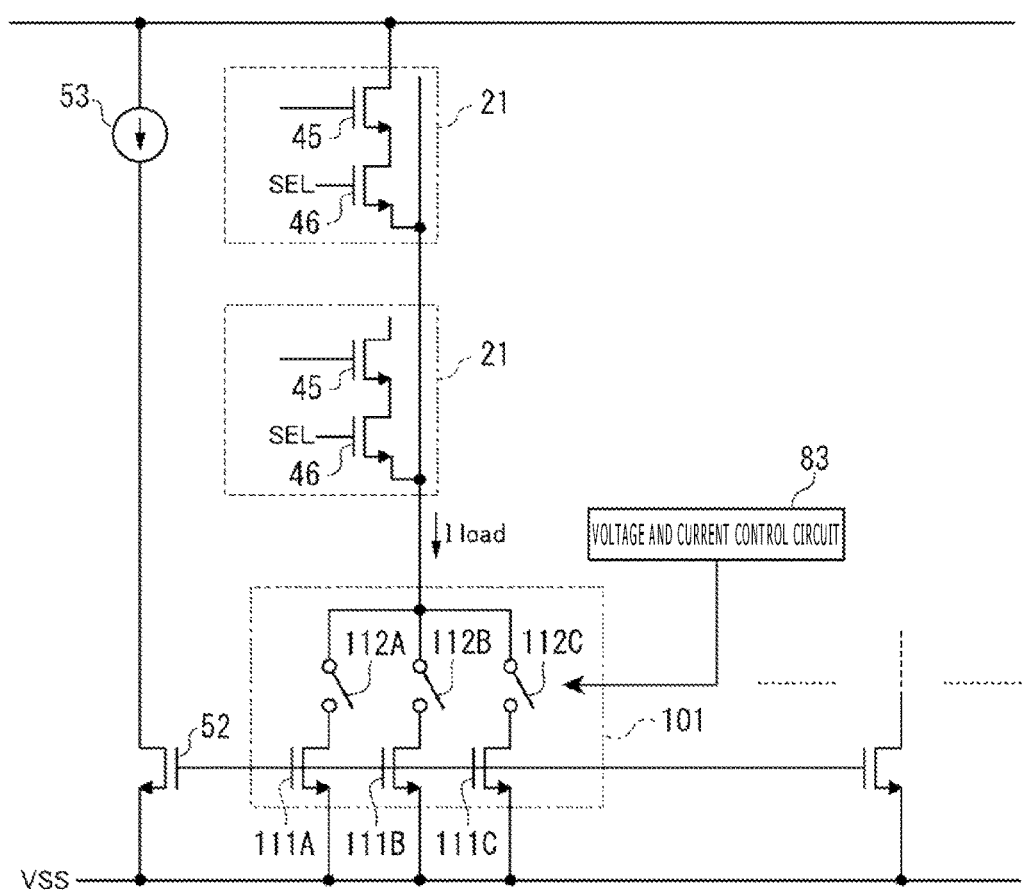
FIG. 11 is a diagram depicting an example of a detailed circuit configuration of a variable current source according to the fourth embodiment.

FIG. 11 depicts an example of a detailed circuit configuration of the variable current source 101 provided for one pixel column.

The variable current source 101 is configured, for example, by three load MOSs 111A to 111C and switches 112A to 112C, in a similar manner to that of a copy source of the current mirror circuit in the second embodiment. The voltage and current control circuit 83 can change the current Iload by controlling the on and the off of the switches 112A to 112C.

Referring back to FIG. 11, for each of the three areas arranged in the horizontal direction, the voltage and current control circuit 83 can independently control by area the switches 112A to 112C of the variable current source 101.

For the areas of which vertical positions are different, since the read timings are different, the voltage and current control circuit 83 controls by time division the switches 112A to 112C of the variable current source 101, for each of the three areas arranged in the vertical direction.

The current control process in the fourth embodiment is similar to the process described with reference to FIG. 7, except that the voltage and current control circuit 83 calculates by each of a plurality of divided areas the dynamic range of pixel signals and controls by area the current Iload flowing through the load MOS 111 of the variable current source 101.

According to the fourth embodiment, power consumption can be further reduced by dividing the pixel array section 15 into a plurality of areas, and by adjusting in real time by area the current Iload flowing through the load MOS 111 of the constant current source circuit 16.

As described above, according to the third and fourth embodiments, the pixel array section 15 is divided into a plurality of areas, the areas arranged in the horizontal direction are controlled by circuit division, and the areas arranged in the vertical direction are controlled by time division. Consequently, power consumption is further reduced.

Further, according to the above-described embodiments, the supply voltage and the supply current in portions of analog circuits of which pixel signals are before AD converted can be reduced. Therefore, low power consumption in the analog circuits that occupy a relatively large ratio when pixels are miniaturized can be realized.

Further, for the circuit configuration of each pixel 21, addition of an element is unnecessary. Therefore, the pixels can be miniaturized. Consequently, low power consumption can be realized in a simpler configuration.

The solid-state image pickup device 1 includes both a voltage control function for adjusting by frame or by area the source voltage VSS of the constant current source circuit 16, and a current control function for adjusting by frame or by area the current Iload flowing through the load MOS 51. Alternatively, the solid-state image pickup device 1 may include any one of the functions. Further, either the voltage control function or the current control function may be executed, or both functions may be executed simultaneously. Whether or not which one of the functions the solid-state image pickup device 1 should execute can be determined based on a control signal supplied from an external control device via an input terminal not depicted.

5. Fifth Embodiment

Figure 12:
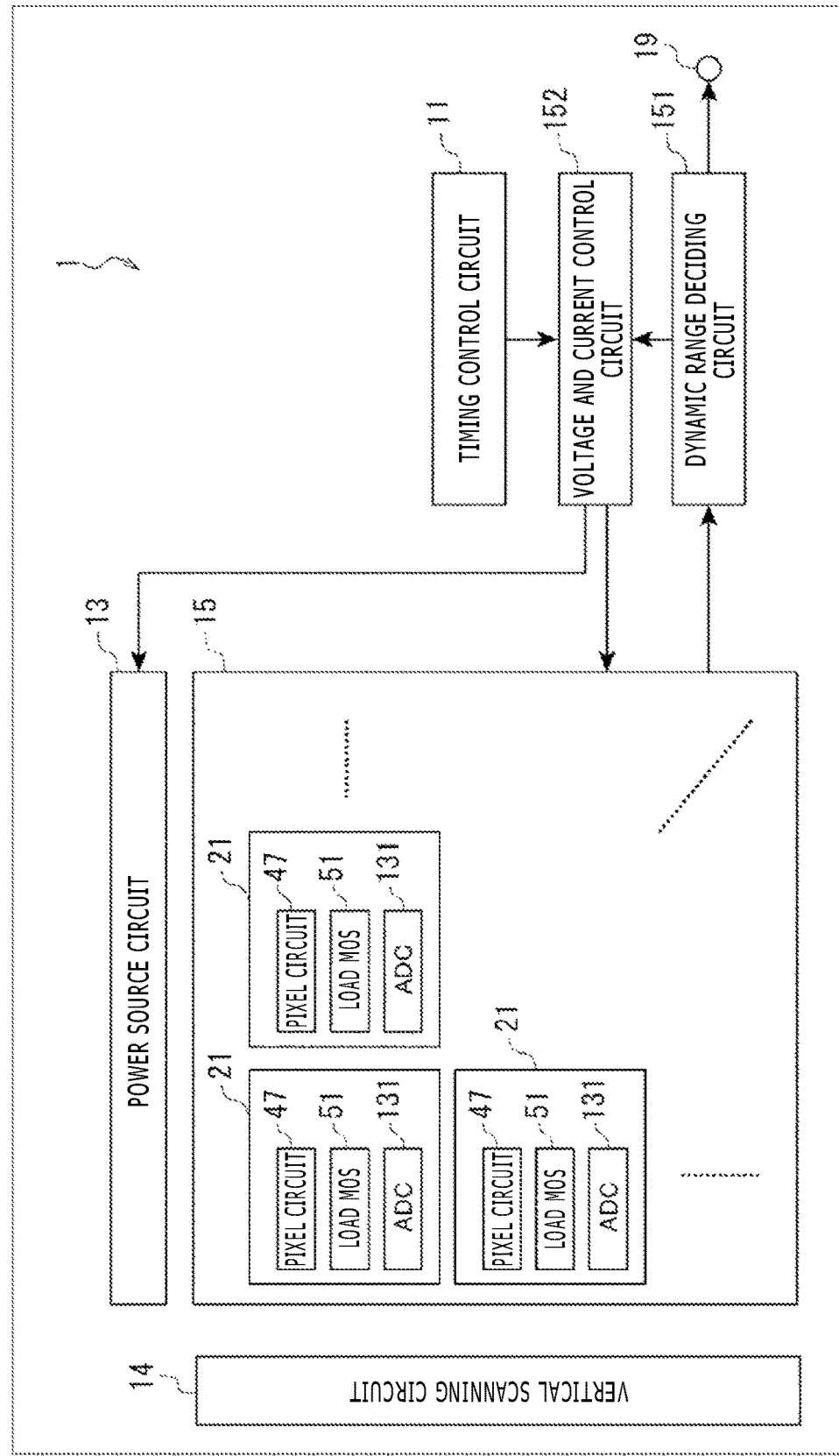
FIG. 12 is a block diagram depicting an example of a schematic configuration of a solid-state image pickup device according to a fifth embodiment.

FIG. 12 is a block diagram depicting an example of a schematic configuration of the solid-state image pickup device 1 according to a fifth embodiment.

Figure 13:
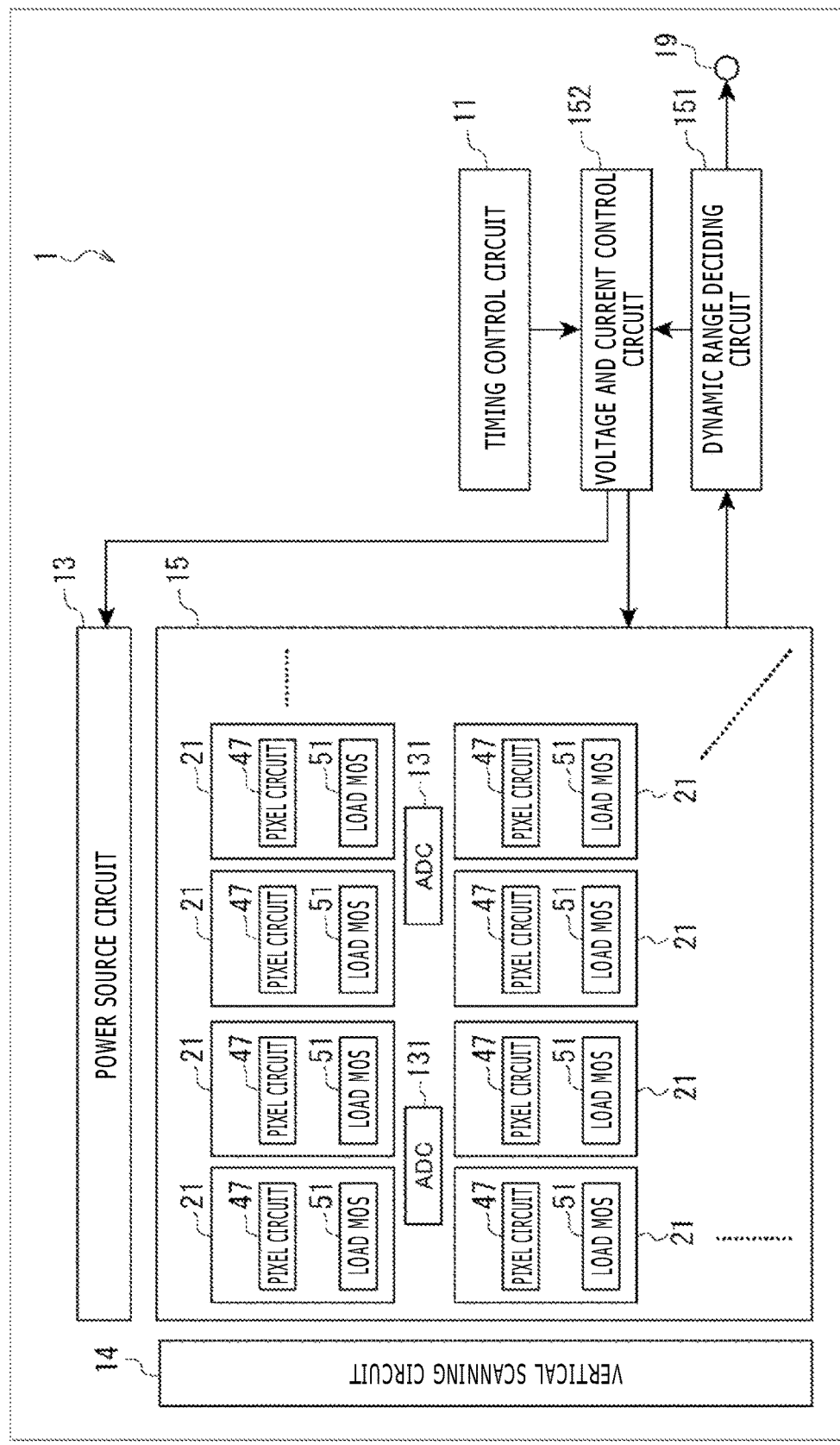
FIG. 13 is a block diagram depicting an example of a schematic configuration of a solid-state image pickup device according to a sixth embodiment.

In FIGS. 12 and 13, portions corresponding to those in the above embodiments are also denoted with the same reference signs, and description of these portions will be appropriately omitted.

In the first to fourth embodiments, the load MOS 51 and the ADC are configured to be provided by column.

On the other hand, in the fifth embodiment depicted in FIG. 12, the load MOS 51 and the ADC are configured to be provided by pixel.

Specifically, in each pixel 21 of the pixel array section 15, a pixel circuit 47, the load MOS 51, and an ADC 131 are formed. The pixel circuit 47 includes the photodiode 41, the transfer transistor 42, the FD 43, the reset transistor 44, the amplification transistor 45, and the selection transistor 46, described with reference to FIG. 2.

In the fifth embodiment, in each pixel 21, the pixel signal generated by the pixel circuit 47 is supplied to the ADC 131 via the load MOS 51, and is AD converted by the ADC 131. AD converted pixel signals are temporarily stored in the ADC 131. Then, following the control by the vertical scanning circuit 14 and by a horizontal scanning circuit not depicted, digital pixel signals that are temporarily stored in the ADC 131 of each pixel 21 are output sequentially to a dynamic range deciding circuit 151.

The dynamic range deciding circuit 151 decides by pixel the dynamic range of pixel signals, and supplies a decision result to a voltage and current control circuit 152.

The voltage and current control circuit 152 determines and controls the source voltage VSS of the load MOS 51 or the current Iload flowing through the load MOS 51, based on the decision result (a level decision value) of the dynamic range by pixel supplied from the dynamic range deciding circuit 151. The method for controlling the source voltage VSS and the current Iload is similar to those in the above-described other embodiments.

6. Sixth Embodiment

FIG. 13 is a block diagram depicting an example of a schematic configuration of the solid-state image pickup device 1 according to a sixth embodiment.

In the fifth embodiment depicted in FIG. 12, the ADC 131 is provided for each pixel. Whereas, in the sixth embodiment depicted in FIG. 13, one ADC 131 is formed by plurality of pixels (four pixels in FIG. 13).

In the plurality of pixels 21 that share one ADC 131, pixel signals generated by the pixel circuits 47 are supplied to the ADC 131 in a predetermined order, and are AD converted. The AD converted pixel signals are supplied to the dynamic range deciding circuit 151.

The dynamic range deciding circuit 151 decides by pixel the dynamic range of pixel signals, and supplies a decision result to a voltage and current control circuit 152.

The voltage and current control circuit 152 determines and controls the source voltage VSS of the load MOS 51 or the current Iload flowing through the load MOS 51, based on the decision result (a level decision value) of the dynamic range by pixel supplied from the dynamic range deciding circuit 151. The method for controlling the source voltage VSS and the current Iload is similar to those in the above-described other embodiments.

According to the fourth and fifth embodiments, power consumption can be reduced by adjusting in real time by pixel the source voltage VSS of the load MOS 51 and the current Iload flowing through the load MOS 51.

Further, in the fourth and fifth embodiments, the minimum unit of the control of the source voltage VSS and the current Iload is a pixel. The source voltage VSS and the current Iload can be also adjusted in real time by area or by frame, as performed in the above-described other embodiments.

When the ADC 131 is provided by pixel or by area (by group of pixels) as performed in the fourth and fifth embodiments, provision of the load MOS 51 can be omitted. In this case, the current Iload flowing through the load MOS 51 is not controlled, and only the source voltage VSS is controlled.

7. Example of Application to Electronic Apparatus

The present technique is not limited to be applied to a solid-state image pickup device. That is, the present technique is applicable to the whole electronic apparatus that uses a solid-state image pickup device in the image capturing unit (a photoelectric conversion unit), including an image pickup device of a still camera and a video camera, a portable terminal device having an image capturing function, and a copying machine using a solid-state image pickup device in the image reading section. The solid-state image pickup device may be provided in a mode having the device formed in one chip, or may be provided in a module mode of an image-pickup function in which the image capturing unit and the signal processing unit or the optical system are packaged together.

Figure 14:
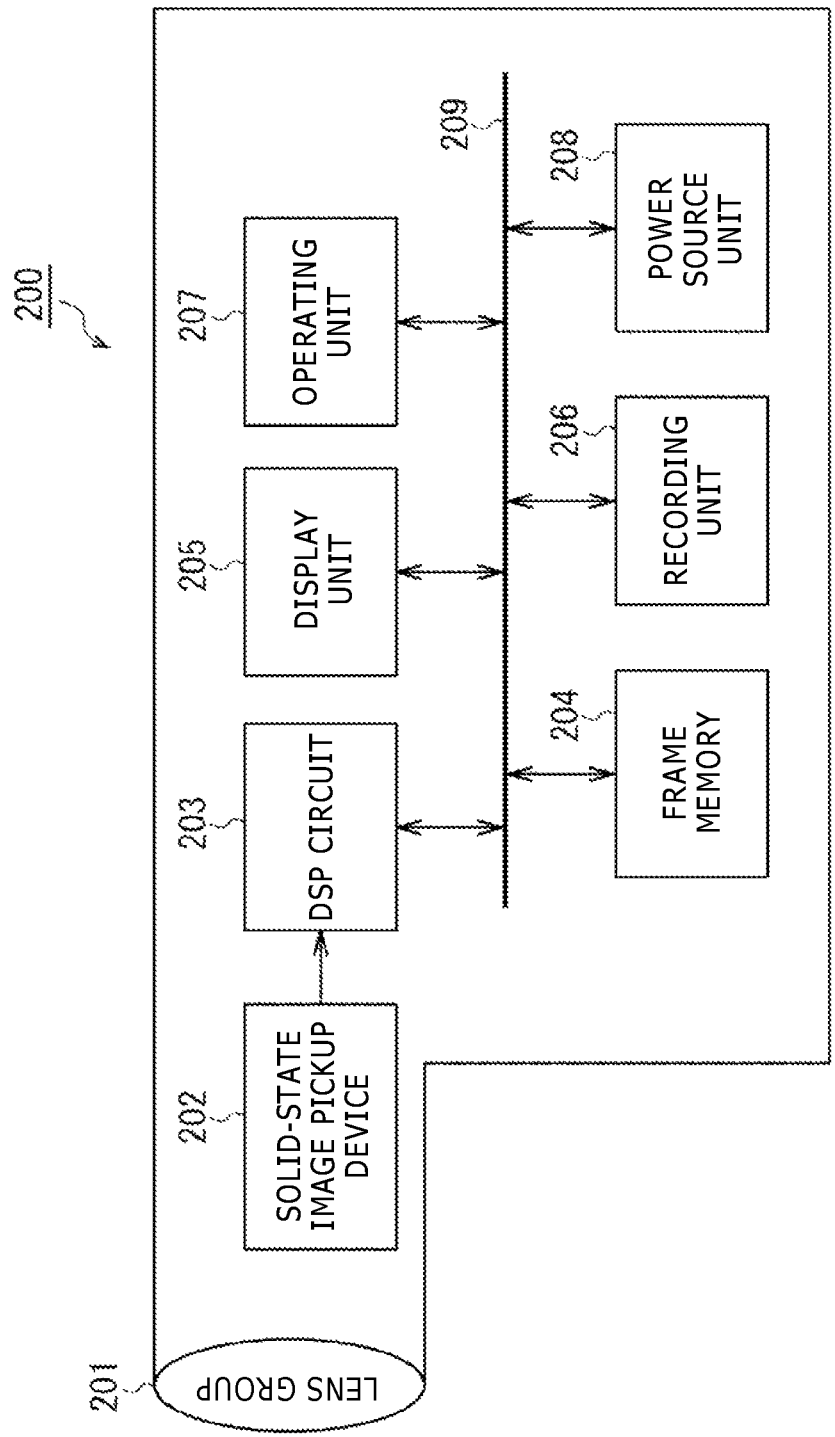
FIG. 14 is a block diagram depicting an example of a configuration of an image pickup device working as an electronic apparatus to which the present technique is applied.

FIG. 14 is a block diagram depicting an example of an image pickup device working as an electronic apparatus to which the present technique is applied.

An image pickup device 200 in FIG. 14 includes an optical unit 201 formed of a lens group, a solid-state image pickup device (an image pickup device) 202 employing the configuration of the solid-state image pickup device 1 in FIGS. 1 and 8, etc., and a digital signal processor (DSP) circuit 203 working as a camera signal processing circuit. The image pickup device 200 also includes a frame memory 204, a display unit 205, a recording unit 206, an operating unit 207, and a power source unit 208. The DSP circuit 203, the frame memory 204, the display unit 205, the recording unit 206, the operating unit 207, and the power source unit 208 are connected to each other via a bus line 209.

The optical unit 201 captures light (image light) incident from a subject, and forms an image on the imaging surface of the solid-state image pickup device 202. The solid-state image pickup device 202 converts the amount of light of the incident light formed on the imaging surface, into an electric signal by pixel, and outputs the electric signal in the form of a pixel signal. For the solid-state image pickup device 202, there can be used the solid-state image pickup device 1 depicted in FIG. 1, FIG. 8, FIG. 12, or FIG. 13, that is, the solid-state image pickup device capable of reducing power consumption by controlling, by frame, by area, or by pixel, the supply voltage or the supply current.

The display unit 205 includes, for example, a panel-type display device such as a liquid crystal panel or an organic electro luminescence (EL) panel, and displays a moving image or a still image captured by the solid-state image pickup device 202. The recording unit 206 records the moving image or the still image captured by the solid-state image pickup device 202, onto a recording medium such as a hard disk or a semiconductor memory.

The operating unit 207 issues, under the operation by a user operation, instructions regarding various functions of the image pickup device 200. The power source unit 208 appropriately supplies to supply targets various power which becomes an operation power source of the DSP circuit 203, the frame memory 204, the display unit 205, the recording unit 206, and the operating unit 207.

As described above, power consumption can be reduced, by using the solid-state image pickup device 1 according to each of the above embodiments, for the solid-state image pickup device 202. Therefore, power consumption can be also reduced in the image pickup device 200 for a video camera and a digital still camera, and further for a camera module of a mobile apparatus such as a mobile phone.

Further, the present technique is not limited to be applied to a solid-state image pickup device that captures an image by detecting a distribution of the amount of incident visible light, and is applicable to the whole of a solid-state image pickup device that captures an image of the distribution of the amount of incident infrared rays or X rays, or particles, and a solid-state image pickup device (a physical quantity distribution detecting device), in a broader sense, such as a fingerprint detection sensor that captures an image of the distribution of other physical quantity of pressure or electrostatic capacitance.

Further, the present technique is applicable, not only to the solid-state image pickup device, but to the whole semiconductor devices having other semiconductor integrated circuits.

Embodiments of the present technique are not intended to be limited to the above-described embodiments, and various modifications are possible within a range not deviating from the scope of the present technique.

For example, it is possible to adopt a mode of a combination of all or some of the plurality of the above-described embodiments.

Further, the effects described in the present specification are not intended to be limited but are merely exemplifications, and there may be effects other than those described in the present specification.

The present technique can also take the following configurations.

(1)
A solid-state image pickup device includes a pixel array section that has a plurality of pixels arranged two-dimensionally in a matrix shape, load transistors each of which configures a source follower circuit with an amplification transistor of each pixel of the pixel array section, and a control circuit that, in accordance with an amount of light received by one or more of the pixels, controls a supply voltage of each of the load transistors or controls a current flowing through each of the load transistors.

(2)
The solid-state image pickup device according to (1) above, further includes a dynamic range deciding circuit that decides a dynamic range of pixel signals of the plurality of pixels, in which the control circuit controls a supply voltage of each of the load transistors or controls a current flowing through each of the load transistors, based on a decision result of the dynamic range which is the amount of light received by the pixels.

(3)
The solid-state image pickup device according to (2) above, in which the dynamic range deciding circuit decides, by frame, the dynamic range of pixel signals of the plurality of pixels.

(4)
The solid-state image pickup device according to (3) above, in which the control circuit controls a current flowing through each of the load transistors, by controlling, based on a decision result of the dynamic range, a current flowing through one or more transistors each configuring a current mirror circuit with the load transistor.

(5)
The solid-state image pickup device according to (2) above, in which the pixel array section is divided into a plurality of areas, and the dynamic range deciding circuit decides, by area, the dynamic range of pixel signals of the plurality of pixels.

(6)
The solid-state image pickup device according to (5) above, in which areas arranged in a horizontal direction are controlled by circuit division, and areas arranged in a vertical direction are controlled by time division.

(7)
The solid-state image pickup device according to (5) or (6) above, in which a plurality of the load transistors are provided in parallel at an output destination of the amplification transistor of each pixel of the pixel array section, and the control circuit controls a current flowing through each of the load transistors, by changing over between numbers of the plurality of load transistors arranged in parallel, based on a decision result of the dynamic range.

(8) The solid-state image pickup device according to any one of (1) to (7) above, in which the control circuit controls a source voltage of the load transistor, when controlling a supply voltage of the load transistor.

(9) A method for controlling a solid-state image pickup device including a pixel array section that has a plurality of pixels arranged two-dimensionally in a matrix shape, load transistors each of which configures a source follower circuit with an amplification transistor of each pixel of the pixel array section, and a control circuit that controls a supply voltage of each of the load transistors or controls a current flowing through each of the load transistors, the method includes, by the control circuit, in accordance with an amount of light received by one or more of the pixels, controlling the supply voltage of each of the load transistors or controlling the current flowing through each of the load transistors.

(10) An electronic apparatus includes a solid-state image pickup device, the solid-state image including a pixel array section that has a plurality of pixels arranged two-dimensionally in a matrix shape, load transistors each of which configures a source follower circuit with an amplification transistor of each pixel of the pixel array section, and a control circuit that, in accordance with an amount of light received by one or more of the pixels, controls a supply voltage of each of the load transistors or controls a current flowing through each of the load transistors.

REFERENCE SIGNS LIST

1 Solid-state image pickup device, 12 Voltage and current control circuit, 13 Power source circuit, 15 Pixel array section, 16 Constant current source circuit, 17 Column AD conversion circuit, 18 Dynamic range deciding circuit, 21 Pixel, 45 Amplification transistor, 51 Load MOS, 52 MOS transistor, 53 Current source, 55A to 55C MOS transistors, 56A to 56C Switches, 81 Memory circuit, 82 Dynamic range deciding circuit, 83 Voltage and current control circuit, 91 Power supply line, 101 Variable current source, 200 Image pickup device, 202 Solid-state image pickup device

What is claimed is:
1. A solid-state image pickup device comprising:
a pixel array section that has a plurality of pixels arranged two-dimensionally in a matrix shape;
load transistors each of which configures a source follower circuit with an amplification transistor of each pixel of the pixel array section;
a dynamic range deciding circuit that decides a dynamic range of pixel signals of the plurality of pixels; and
a control circuit that, in accordance with the decided dynamic range, controls a supply voltage of each of the load transistors or controls a current flowing through each of the load transistors, wherein the control circuit decreases the supply voltage of each of the load transistors or decreases the current flowing through each of the load transistors when the dynamic range is large and the control circuit increases the supply voltage of each of the load transistors or increases the current flowing through each of the load transistors when the dynamic range is small.
2. The solid-state image pickup device according to claim 1, wherein
the dynamic range comprises an amount of light received by the pixels.
3. The solid-state image pickup device according to claim 1, wherein the dynamic range deciding circuit decides, by frame, the dynamic range of pixel signals of the plurality of pixels.
4. The solid-state image pickup device according to claim 3, wherein the control circuit controls a current flowing through each of the load transistors, by controlling, based on a decision result of the dynamic range, a current flowing through one or more transistors each configuring a current mirror circuit with the load transistor.
5. The solid-state image pickup device according to claim 1, wherein the pixel array section is divided into a plurality of areas, and the dynamic range deciding circuit decides, by area, the dynamic range of pixel signals of the plurality of pixels.
6. The solid-state image pickup device according to claim 5, wherein areas arranged in a horizontal direction are controlled by circuit division, and areas arranged in a vertical direction are controlled by time division.
7. The solid-state image pickup device according to claim 1, wherein a plurality of the load transistors are provided in parallel at an output destination of the amplification transistor of each pixel of the pixel array section, and the control circuit controls a current flowing through each of the load transistors, by changing over between numbers of the plurality of load transistors arranged in parallel, based on a decision result of the dynamic range.
8. The solid-state image pickup device according to claim 1, wherein the control circuit controls a source voltage of the load transistor when controlling a supply voltage of the load transistor.
9. A method for controlling a solid-state image pickup device including a pixel array section that has a plurality of pixels arranged two-dimensionally in a matrix shape, load transistors each of which configures a source follower circuit with an amplification transistor of each pixel of the pixel array section, a dynamic range deciding circuit that decides a dynamic range of pixel signals of the plurality of pixels, and a control circuit that controls a supply voltage of each of the load transistors or controls a current flowing through each of the load transistors, the method comprising:
by the control circuit, in accordance with the decided dynamic range, controlling the supply voltage of each of the load transistors or controlling the current flowing through each of the load transistors, wherein the control circuit decreases the supply voltage of each of the load transistors or decreases the current flowing through each of the load transistors when the dynamic range is large and the control circuit increases the supply voltage of each of the load transistors or increases the current flowing through each of the load transistors when the dynamic range is small.
10. An electronic apparatus including a solid-state image pickup device, the solid-state image pickup device comprising:
a pixel array section that has a plurality of pixels arranged two-dimensionally in a matrix shape;
load transistors each of which configures a source follower circuit with an amplification transistor of each pixel of the pixel array section;
a dynamic range deciding circuit that decides a dynamic range of pixel signals of the plurality of pixels, wherein the dynamic range comprises an amount of light received by one or more of the plurality of pixels: and a control circuit that, in accordance with the dynamic range, controls a supply voltage of each of the load transistors or controls a current flowing through each of the load transistors, wherein the control circuit decreases the supply voltage of each of the load transistors or decreases the current flowing through each of the load transistors when the dynamic range is large and the control circuit increases the supply voltage of each of the load transistors or increases the current flowing through each of the load transistors when the dynamic range is small.

\* \* \* \* \*